United States Patent Office 3,486,196
Patented Dec. 30, 1969

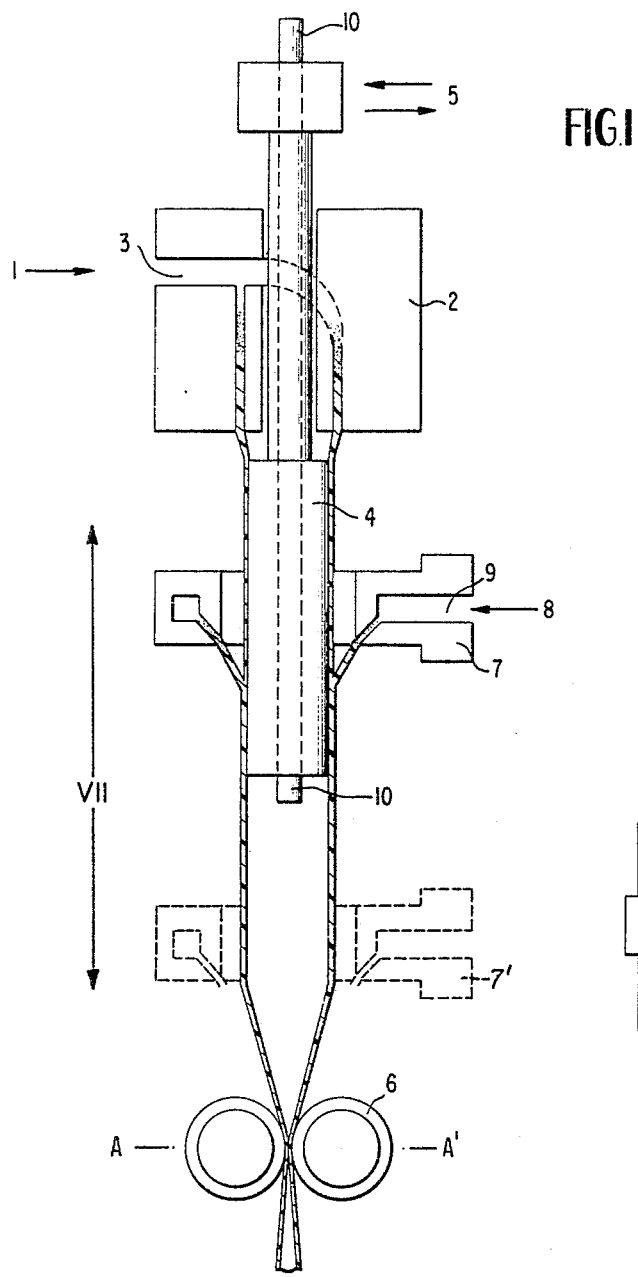
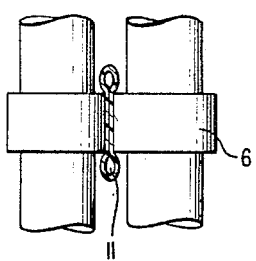

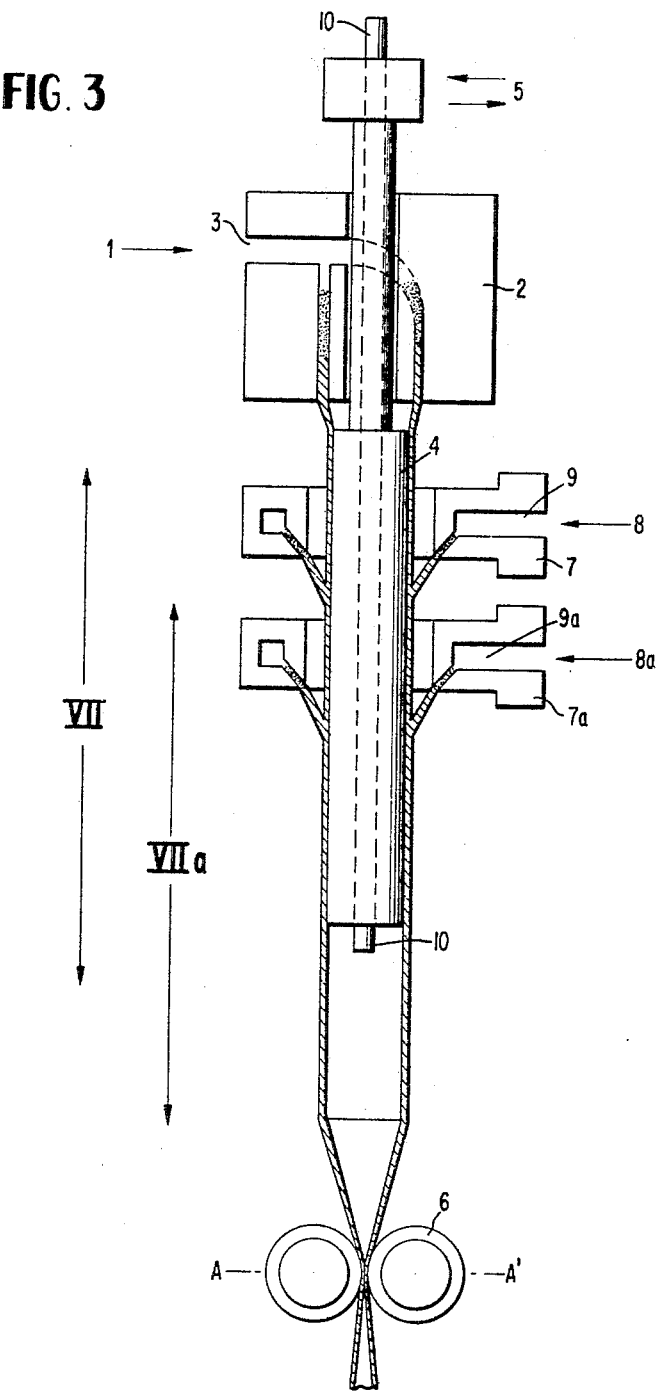

3,486,196
APPARATUS FOR THE PRODUCTION OF MULTI-LAYER TUBES FROM THERMOPLASTICS
Ludwig Klenk and Walter Seifried, Wiesbaden-Biebrich, and Hans Strutzel, Wiesbaden-Dotzheim, Germany, assignors to Kalle Aktiengesellschaft, Wiesbaden-Biebrich, Germany, a corporation of Germany
Filed Mar. 31, 1966, Ser. No. 539,158
Claims priority, application Germany, Apr. 2, 1965, K 55,706
Int. Cl. B29d 23/04
U.S. Cl. 18—14                     5 Claims

ABSTRACT OF THE DISCLOSURE

This invention relates to an apparatus and process for the continuous production of multilayer tubes from thermoplastic materials, the apparatus comprising a mandrel, means for cooling the mandrel, a first annular slot die coaxial with the mandrel for the preparation of an inner tube layer, at least one additional annular slot die coaxial with the mandrel and being movable along the mandrel in an axial direction for preparation of an outer tube layer, and means for drawing-off the finished tube.

The present invention relates to an apparatus for the continuous production of multilayer tubes from thermoplastics.

Tubes with walls consisting of several layers of thermoplastics are widely used for packaging purposes. Suitable selection and positioning of the thermoplastics forming the tube permit the production of tubular films with properties adapted to the specific packaging problems.

Frequently used are, for example, tubes for wrapping purposes the inside of which consists of a thermoplastic material with a low softening temperature, whereas the outside has a higher softening temperature. Such tubes may be processed particularly easily in packaging machines to form bags and the like, since the inner layer easily may be welded or sealed at a temperature at which the outer layer, which usually effects the stability of the entire tube, is not yet affected.

Besides the thermoplastics which impart sealability or a certain stability to the multilayer tubular films, there also are used plastics which impart to the multilayer film certain properties as regards gas- or flavor-permeability or a special shrinkage characteristic. For the production of such multilayer tubes, there are employed extrusion processes using die heads with two or more concentrically arranged annular nozzles. Uniting the streams of the fused thermoplastics may be performed inside or outside the die heads.

In a known process, the adhesion between the individual layers is achieved by inflating the inner tube in a manner such that, while still being in the plastic state, it is pressed against the outer tube. It often occurs that the adhesion is not sufficient. Processes have, therefore, been developed in which the surfaces of the films are subjected to special treatments for increasing the adhesion.

Futhermore, processes for the production of multilayer plastic tubes are also known in which the required adhesion between the layers is achieved by uniaxially or multiaxially stretching the composite material.

A disadvantage of the extrusion processes using die heads with concentrically arranged annular slot dies is that the plastics in the interior of the die heads are exposed to the same temperature. Applying different temperatures for the various materials is possible only with high technical expenditure. When the material having a low softening temperature is exposed to too high temperatures in the extruder head, difficulties usually arise, since the viscosity and/or thermostability of the material are affected.

In order to overcome this drawback, processes have been developed using different dies for each material. It is known, for example, to coat by extrusion a freshly extruded tube with another plastic. The drawback of this process lies in the fact that the primary tube, usually having a small wall thickness only and consisting of a material having a low softening temperature, is fused at the line of impact by the secondary tube which must be processed at a higher temperature. But also in the case where the primary tube consists of a material having a higher softening temperature, difficulties arise due to the fact that the inner and outer sides of the primary tube evenly cool and, when the secondary tube strikes the outer side, the primary tube exhibits a plasticity which is insufficient for the adhesion of the composite tube.

Internal calibrating is another method for the production of tubes from thermoplastics, wherein the formed plastic leaving an annular slot die travels onto a cooled mandrel where it solidifies and can be drawn off by suitable conveyor means. This process, however, has not been employed for the production of multilayer tubes from thermoplastics.

It now has been found that multilayer tubes from thermoplastics may be produced in a manner such that first the inner tube is produced according to the internal calibrating method, the temperature along the calibrating zone being adjustable, and then the outer layers of the tube are applied successively within the calibrating zone by means of separated annular dies which are coaxial with the mandrel and movable along the calibrating zone, in order to be then drawn off by suitable conveyor means. Before the continuous operation, the temperature along the calibrating zone, as well as the die positions for the individual plastics are adjusted by moving the dies in a manner such that the finished tube has the best possible adhesion between the individual adjacent layers. According to this process, generally tubular films with any number of layers may be produced. It has proved to be practical to apply not more than five layers upon one another.

The dimensions of the tubular films manufactured according to the process described may widely vary. Diameters from 10 to 1000 mm. are thus possible. The thickness of each layer may be in the range of 0.002 to 0.4 mm. The entire wall thickness of a multilayer tube may be in the range of 0.01 to 0.8 mm.

Principally, suitable materials are all extruded thermoplastics. Particularly suitable are, however, polyesters, such as polyethylene terephthalate, or copolyesters of polyethylene terephathalate, it being possible to replace the acid component, e.g. by isophthalic acid or cyclobutane dicarboxylic acid, or to replace the glycol by other lower aliphatic or cycloaliphatic diols, or polyamides such as polycaprolactam or poly-$\beta$-lactam or copolymers of various lactams as well as polyalkylenes such as polyethylene, polypropylene or polybutylene.

Principally, the temperature along the calibrating zone progressively decreases, i.e. the polymer material on the mandrel is cooled. Usually, the mandrel is cooled by counterflowing water. The velocity of flow and temperature of the water may influence the temperature along the calibrating zone. Generally, besides water there also may be used other cooling media with other thermal capacities and other coefficients of heat transfer. It is often preferable to divide the calibrating zone into zones of different cooling rate. This is advantageously performed in a manner such that the mandrel is divided into different compartments which are cooled to different degrees. Furthermore, sometimes it has proved advantageous not to have a steadily decreasing temperature along the calibrating zone but to insert also a zone where the temperature increases again. This may be effected by suitable heating means in the interior of the mandrel. Usually, the surface temperature at one end of the mandrel, according to the temperature of the applied melt, is in the range of about 100 to 300° C.; the temperature at the other end of the mandrel may be in the range of 15 to 50° C.

In determining the position of the dies for the second and the additional layers, an outer tube should strike an inner tube near the zone where the inner tube, due to the transmission of heat to the mandrel, on the one hand is cooled to such an extent that it can no longer be fused by the impinging melt and, on the other hand, the surface of the primary tube has a temperature above the softening temperature of the thermoplastic used or can be heated to such a temperature by the heat content of the impinging secondary tube.

The draw-off speed of the finished tube, which is the same as the feed speed of the tube formed on the mandrel, may be from 2 m. to 50 m. per minute. Preferred draw-off speeds, however, are between 5 m. and 20 m. per minute.

The adhesion qualities between two adjacent layers of thermoplastic materials may, to a certain extent, be judged with the naked eye, since visible irregularities occur with poor adhesion. The desired maximum adhesion quality which, of course, can not be judged with the naked eye may be determined by conventional testing means measuring the force required to separate two layers.

The multilayer tubes produced in accordance with the process of the present invention may be further processed by known stretching methods as regards both the length and the diameter. It is also possible to combine the process of the present invention with the known surface treatment methods of films in order to improve the adhesion properties.

The present invention also provides an apparatus for the performance of the process for the production of multilayer tubes from thermoplastic materials. The apparatus includes the following elements:

A first annular slot die for the production of the inner tube, adjacent thereto an internal mandrel with cooling means and, if required, heating means and, for the outer layers of the tube, further separate annular slot dies coaxially surrounding the mandrel and arranged in a consecutive order along the calibrating zone and being movable in an axial direction for adjusting the dies for the outer layers, as well as a conveyor system preferably consisting of two rollers for drawing off the finished tube.

The diameter of the mandrel may be equal to or smaller or greater than the diameter of the first annular slot die. For thermoplastics having low melt viscosities, diameters are preferred which are smaller than the diameter of the annular slot die whereas for materials having very high melt viscosities, greater diameters are preferable.

By a suitable selection of the dies, it can be achieved that the distance between the individual dies for the outer layers may be kept very small. In practice, however, the distance between the individual dies usually is not maintained smaller than 10 mm. and generally the distance of the dies does not exceed 150 mm. For the production of a tube of five individual layers, an apparatus is used the calibrating zone of which has a length of 500 mm. Generally, however, the mandrel has a length of 200 to 300 mm., since the production of films consisting of two layers only is preferred.

Apparatus for use in the process of the invention is further illustrated in the accompanying FIGURES 1 and 2, in which:

FIGURE 1 is a diagrammatic view of the apparatus of the invention,

FIGURE 2 is a section through the conveyor system,

FIGURE 3 is a diagrammatic view of an apparatus which includes two additional slot dies 7 and 7a, both of which are movable along the mandrel in an axial direction.

Figure 4:
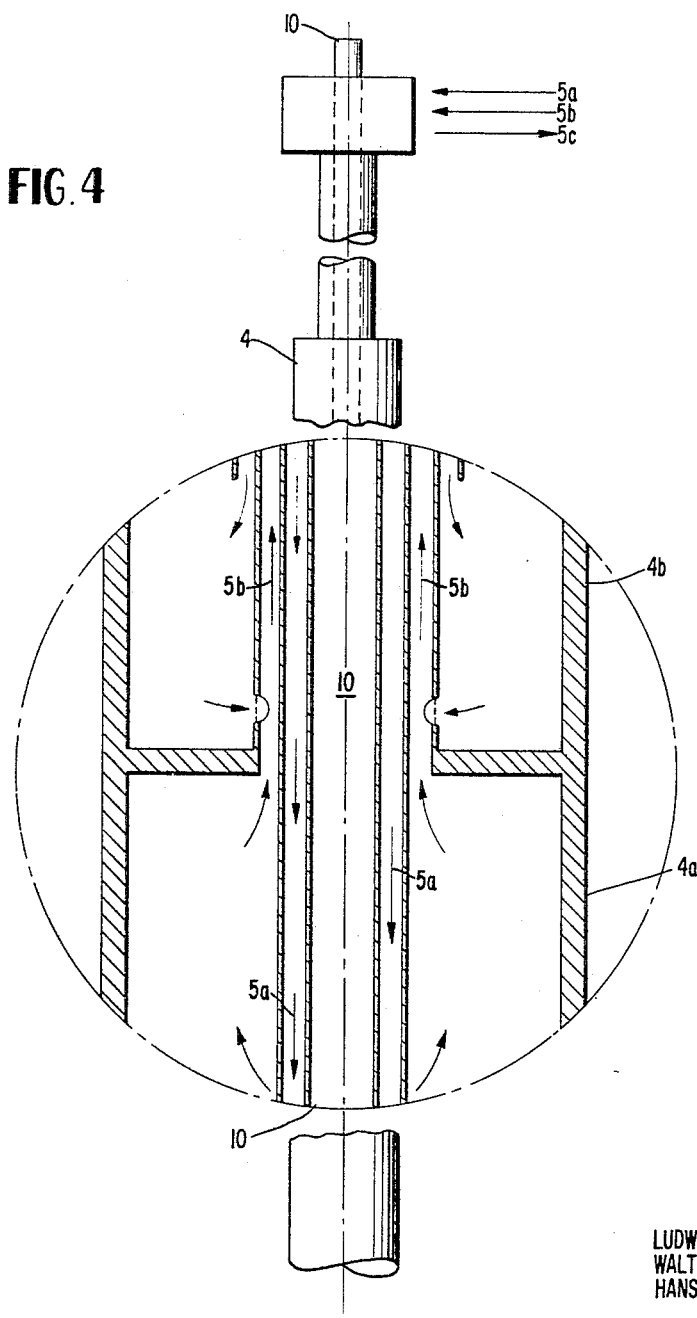
FIGURE 4 is an enlarged section of a heatable or coolable mandrel.

A thermoplastic material 3 fused in an extruder 1 (not shown) and forced through the annular slot die 2 strikes a cooled, generally cylindrical, mandrel 4 which serves to calibrate the dimensions of the tube. The mandrel 4 is mounted coaxially within the annular die and is insulated against heat-conduction from the surrounding die. A cooling medium 5, generally water, is passed through the mandrel. The melt flows down onto the mandrel, solidifies due to loss of heat upon contacting the cooled mandrel and is drawn over the latter by means of a conveyor system 6. For the next layer of the tube, another die means 7 is used which is fed with the thermoplastic material 9 from an extruder 8 (not shown). The die means 7 has a bore-hole with a diameter larger than the outer diameter of the primary tube formed on the mandrel. It is so arranged that it is movable in an axial direction between the conveyor means 6 and the first annular slot die so that after the primary tube has been gripped by the conveyor means the die means 7 can be put into its operating position. The bottom portion of the die means 7 is shown, in FIGURE 1, in phantom and is designated 7'. The double arrow VII defines the range of movement of the die 7 between the conveyor means 6 and the annular slot die 2. Beneath the die means 7 there may be mounted further die means serving for the application of additional outer layers. Furthermore, the figure shows a pipe 10 through which air may be injected into the tube in cases where the tube is to be stretched in diameter in a further operation.

As shown in FIGURE 2, the entire section of the multilayer tube is not squeezed, so that a free section 11 remains through which the air may be introduced into the consecutive stretching zone.

FIGURE 3 illustrates an embodiment of the apparatus including the annular slot dies 7 and 7a both of which are movable along the mandrel in an axial direction. The double arrows VII and VIIa illustrate the two ranges of movement between the conveyor means 6 and the first annular slot die 2. For the production of two layers upon the first tube, the die 7 is supplied with material from an extruder 8, not shown, and the die 7a is supplied with material 9a from an extruder 8a, not shown.

FIGURE 4 is an enlarged section of the mandrel 4 which is heatable in the upper portion 4, and which is coolable in the lower portion 4a. The cooling medium 5a and the heating medium 5b are separately supplied through concentric pipes in the upper portion of the mandrel. The two mediums have a common return 5c. Air 10 is supplied through the innermost of the concentric pipes.

The above described process and apparatus permit the production of multilayer tubes of good quality with a very high constant of all parameters. In addition, the process may be performed easily so that continuous production according to this process requires only little process control.

The invention will be further illustrated by reference to the following specific examples. Numbers indicated in the examples refer to the described figures.

EXAMPLE 1

Polethylene having a density of 0.918 g./cm.$^3$ is fed into an extruder 1; the melt is extruded at a temperature of 215° C. from an annular slot die 2 which has an inner diameter of 70 mm. and a slot width of 0.7 mm. The mandrel 4 over which the solidifying melt is passed has a diameter of 72 mm. The primary tube formed on the mandrel has a thickness of 50$\mu$ and is formed at a speed of 20 m./min. Polycaprolactam having a melt viscosity of 420 poises (measured at 260° C., a shear speed gradient of $10^3$ sec.$^{-1}$ and a shear stress of 15 kg./cm.$^2$) is extruded from a second extruder 8 through an annular slot die 7, having a diameter of 84 mm. and a slot width of 0.8 mm., over the primary tube. Upon leaving the die, the polyamide melt has a temperature of 260° C. and impinges upon the primary tube at a distance of 80 mm. from the upper end of the mandrel. The layer thickness of the secondary tube so formed is 50μ. The two united tubes are drawn off as a composite by the conveyor means at a speed of 20 m./min. The adhesion between the two tubes is unsatisfactory.

When the distance of the slot die from the upper end of the mandrel is reduced to 50 mm., the adhesion between the individual tubes markedly increases. When the distance is further reduced to 40 mm., the secondary tube fuses the primary tube at the line of impingement.

EXAMPLE 2

Polyethylene having a density of 0.918 g./cm.$^3$ is fed into an extruder 1; the melt is extruded at a temperature of 210° C. from an annular slot die 2 having an inner diameter of 30 mm. and a slot width of 0.8 mm. and is drawn over a mandrel 4 having an outer diameter of 32 mm. The melt solidifies and can be passed over the mandrel as a 400μ thick tube at a speed of 5 m./min.

Polyethylene terephthalate having a glass transition temperature of 76° C., a crystallization temperature of 132° C. and a melting point of 260° C. (at a reheating speed of 2° C./min.) is fed into an extruder 8 in the form of a dry granulate, where it is melted and passed under pressure to an annular slot die 7. The melt is extruded at a temperature of 270° C., and a viscosity of 1700 poises from the annular slot of the die, which has an inner diameter of 40 mm. and a slot width of 0.7 mm., passed vertically downwardly and, at a distance of 100 mm. from the upper end of the mandrel, passed over and in contact with the primary polyethylene tube.

After passing the draw-off rollers, the cooled composite tube is conveyed into a heating area and heated to a stretching temperature of 83° C. by means of air at 90° C. forced in counter-current flow to the direction of feed of the tube. In this condition, the tube is subjected to longitudinal stretching in a ratio of 3.15 to 1. Transverse stretching may be effected by means of air passed through the pipe 10 at a super-atmospheric pressure of 0.30 kg./cm.$^2$. During transverse stretching, the tube is inflated to a maximum diameter of 130 mm.; the transverse stretching ratio is 4 to 1. Then, the stretched tube is cooled to a temperature below 70° C. by means of a cold-air nozzle mounted beyond the hot-air channel, collapsed to a width of 204 mm. by means of a pair of nip rolls, and finally wound up.

The 20μ thick polyethylene terephthalate tube thus obtained which has a tensile strength of 20 kg./mm.$^2$ in both directions, carries on its inner surface a 30μ thick polyethylene layer which enables the tube to be heat-sealed according to the heat impact process, for example.

EXAMPLE 3

A linear copolyester of tere- and isophthalic acid, the acid component of which consists of 70% terephthalic acid and 30% isophthalic acid, having a glass transition temperature of 65° C. and a melting point of 135° C. is fused in an extruder 1, extruded at a melting temperature of 145° C. from an annular slot die 2 having a diameter of 40 mm. and passed over a cooled mandrel 4 having an outer diameter of 26 mm. The primary tube formed thereby, having a thickness of 200μ, is passed on at a speed of 8 m./min.

Polyethylene terephthalate having a glass transition temperature of 76° C., a crystallization temperature of 132° C. and a melting point of 260° C. (at a reheating speed of 2° C./min.) is fused in the extruder 8 and passed under pressure to the annular slot die 7. The melt is extruded at a viscosity of 1700 poises and a temperature of 270° C. from the annular slot of the die which has an inner diameter of 40 mm. and a slot width of 0.7 mm., passed vertically downwardly and, at a distance of 80 mm. from the upper end of the mandrel, passed over and in contact with the copolyester primary tube.

The secondary tube also has a thickness of 200μ. The draw-off rolls 6 convey the tube into a stretching area where it is heated to a stretching temperature of 83° C. by means of heat radiators and biaxially stretched. The 28μ thick composite tube is heat-sealable on its inner surface.

EXAMPLE 4

Polyethylene terephthalate having a glass transition temperature of 76° C., a crystallization temperature of 132° C. and a melting point of 260° C. (at a reheating speed of 2° C./min.) is fed into an extruder 1 in the form of a dry granulate, where it is melted and passed under pressure to an annular slot die 2. The melt is extruded at a viscosity of 1700 poises and a temperature of 270° C., from the annular slot of the die, which has an inner diameter of 40 mm. and a slot width of 0.7 mm., and passed vertically downwardly. The melt solidifies on the mandrel, which has a diameter of 26 mm. to form a 250μ thick primary tube which is passed on at a speed of 9 m./min.

A linear copolyester of tere- and isophthalic acid, the acid component of which consists of 70% terephthalic acid and 30% isophthalic acid, having a glass transition temperature of 65° C. and a melting point of 135° C. is fused in an extruder 8 and extruded at a melting temperature of 145° C. from an annular slot die 7 having a diameter of 40 mm. and, at a distance of 120 mm. from the upper end of the mandrel, passed over and in contact with the primary tube. The secondary tube has a thickness of 100μ. After passing the draw-off rolls 6, the composite tube is heated in a heating chamber to a temperature of 83° C. and biaxially stretched by means of air passed into the interior of the tube at a superatmospheric pressure of 0.24 kg./cm.$^2$.

EXAMPLE 5

A linear copolyester of tere- and isophthalic acid, the acid component of which consists of 70% terephthalic acid and 30% isophthalic acid, having a glass transition temperature of 65° C. and a melting point of 135° C., is fused in the extruder 1, extruded at a temperature of 145° C. from an annular slot die 2, having a diameter of 40 mm., and passed over and in contact with a cooled mandrel 4 having an outer diameter of 26 mm. The 200μ thick primary tube obtained is passed on at a speed of 8 m./min.

Polyethylene terephthalate having a glass transition temperature at 76° C., a crystallization temperature of 132° C. and a melting point of 260° C. (at a reheating speed of 2° C./min.) is fused in the extruder 8 and passed under pressure to the annular slot die 7. The melt is extruded at a viscosity of 1700 poises and a temperature of 270° C. from the annular slot of the die, which has an inner diameter of 40 mm. and a slot width of 0.7 mm., passed vertically downwardly and, at a distance of 80 mm. from the upper end of the mandrel, passed over and in contact with the copolyester primary tube. The secondary tube also has a thickness of 200μ.

A linear copolyester of tere- and isophthalic acid, the acid component of which consists of 70% terephthalic acid and 30% isophthalic acid, having a glass transition temperature of 65° C. and a melting point of 135° C. is fused in a third extruder, extruded at a melting temperature of 145° C. from a further annular slot die mounted beneath the annular slot die 7 and, at a distance of 150 mm. from the upper end of the mandrel, passed over and in contact with the secondary tube. The thickness of the composite tube is 450μ.

What is claimed is:

1. An apparatus for the continuous production of multi-layer tubes from thermoplastic materials comprising a mandrel, means for cooling the mandrel, a first annular slot die coaxial with the mandrel for the preparation of an inner tube layer, at least one additional annular slot die coaxial with the mandrel, means for moving said additional die along the mandrel in an axial direction for preparation of an outer tube layer, and means for drawing-off the finished tube.

2. An apparatus according to claim 1 including a plurality of additional annular slot dies coaxial with the mandrel and being movable along the mandrel in an axial direction.

3. An apparatus according to claim 1 including means for heating a portion of the mandrel.

4. An apparatus according to claim 1 in which the means for drawing-off the finished tube comprises two rollers.

5. An apparatus according to claim 1 including means for passing a gas through the mandrel.

References Cited

UNITED STATES PATENTS

| 3,308,508 | 3/1967 | Schrenk | 18—13 |
|---|---|---|---|
| 2,957,201 | 10/1960 | Fields et al. | |
| 3,222,721 | 12/1965 | Reynolds. | |
| 2,720,680 | 10/1955 | Gerow | 18—14 |
| 2,902,716 | 9/1959 | Colombo. | |
| 2,932,323 | 4/1960 | Aries | 264—209 X |
| 2,977,632 | 4/1961 | Bunch. | |
| 3,023,461 | 3/1962 | Sherman | 264—173 X |
| 3,068,516 | 12/1962 | Hofer | 18—13 |
| 3,103,036 | 9/1963 | Nave et al. | 264—98 X |
| 3,349,434 | 10/1967 | Hureau. | |

OTHER REFERENCES

Fisher, E. G., Extrusion of Plastics, Iliffe Books Ltd., 1964, pp. 188–189, 184–185.

ROBERT F. WHITE, Primary Examiner

K. J. HOVET, Assistant Examiner

U.S. Cl. X.R.

18—13; 156—244, 501; 264—209, 173